April 28, 1970     D. C. OLIVER     3,508,728
LOAD RELEASE FOR CARGO PARACHUTE
Filed May 27, 1968       2 Sheets-Sheet 1

INVENTOR,
Dwain C. Oliver

BY: Harry M. Saragovitz,
Edward J. Kelly &
R. P. Gibson    ATTORNEYS.

April 28, 1970 D. C. OLIVER 3,508,728
LOAD RELEASE FOR CARGO PARACHUTE
Filed May 27, 1968 2 Sheets-Sheet 2
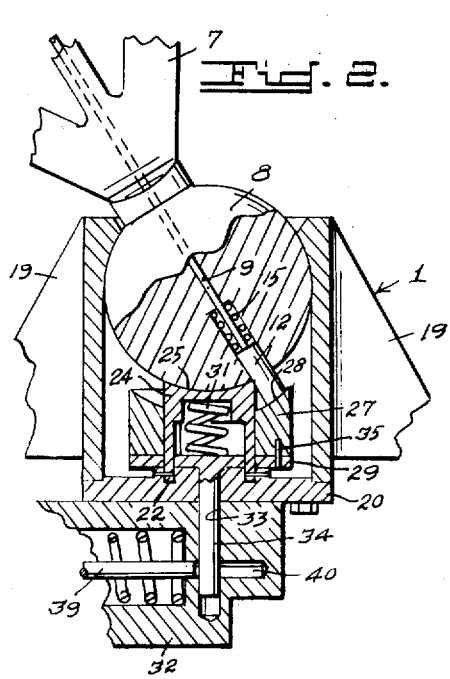
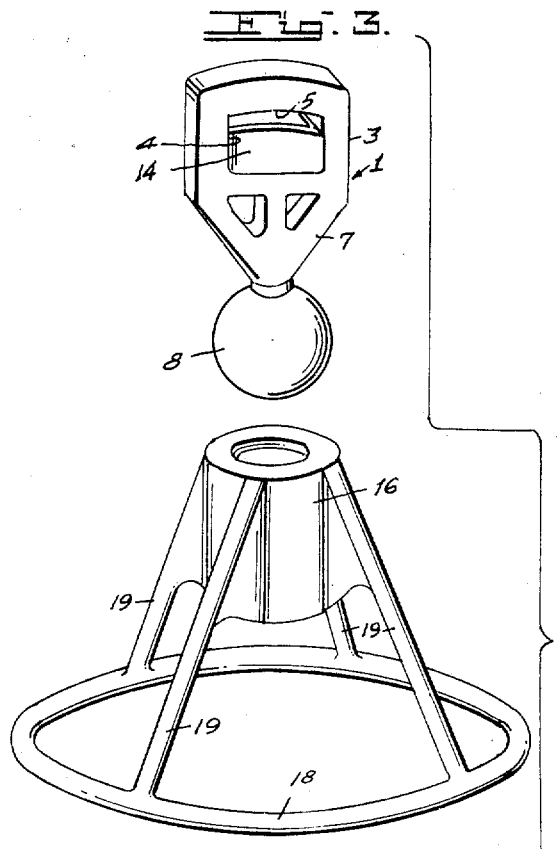
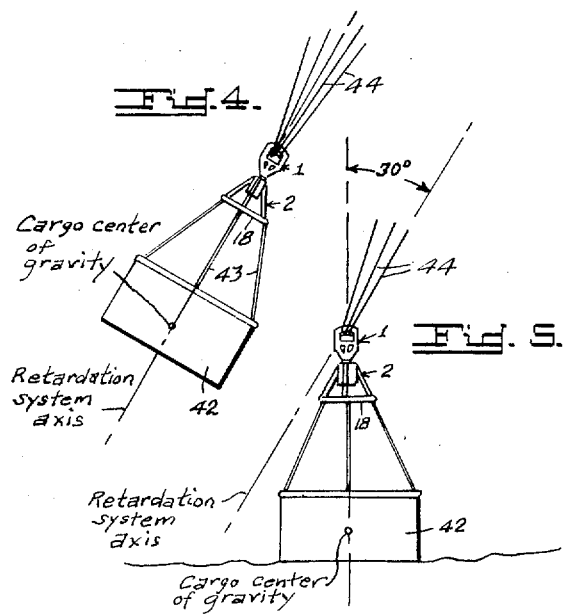
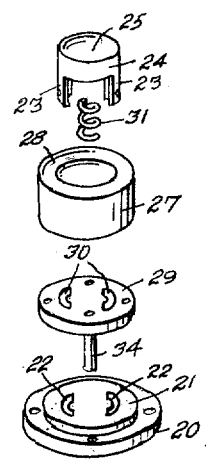
INVENTOR,
Dwain C. Oliver
BY: Harry M. Saragovitz,
Edward J. Kelly &
R. P. Gibson
ATTORNEYS.

United States Patent Office 3,508,728
Patented Apr. 28, 1970

3,508,728
LOAD RELEASE FOR CARGO PARACHUTE
Dwain C. Oliver, Tucson, Ariz., assignor to the United States of America as represented by the Secretary of the Army
Filed May 27, 1968, Ser. No. 732,344
Int. Cl. B64d *17/38*
U.S. Cl. 244—151    6 Claims

ABSTRACT OF THE DISCLOSURE

A release for disconnecting a parachute from a cargo upon landing consisting of a parachute attachment assembly and a load suspension assembly which will separate a parachute therefrom when the wind drag on the parachute tilts the parachute attachment assembly thirty degrees with respect to the load suspension assembly.

---

The invention described herein may be manufactured, used and licensed by or for the Government of the United States of America for governmental purposes without the payment to me of any royalty thereon.

Dropping of cargoes by parachute presents many problems and chief of these is the problem of damage to the cargo after it has landed during strong wind conditions which causes the parachute, instead of collapsing after landing to drag the cargo along the ground.

Another problem was the premature release of the parachute from the cargo while being handled in the cargo plane or during the descent of the apparatus.

Many different types of parachute releases have been developed and utilized in the delivery of cargo, but have proved unreliable, especially during high wind conditions due to their functioning being dependent on the direction of the wind.

The parachute release of this invention is designed to overcome the aforesaid problems by providing a release that will function regardless of the wind direction and will act positively to completely and quicky release the parachute after the cargo has landed by employing a pair of housings that prevents separation of the parachute during descent and separating the parachute upon landing of the cargo by action of the wind in any direction.

It is therefore a principal object of this invention to provide a wind operated release for separating a parachute from a cargo upon landing.

It is another object to provide a parachute release for separating a parachute from a cargo upon landing regardless of the direction of the wind.

Still another object is to provide a parachute release which upon landing will completely separate the parachute from the cargo when the wind dislocates the center of gravity of the cargo thirty degrees with respect to the retardation system axis.

These and other objects of this invention will be more apparent from the following detailed description, drawings and appended claims.

In the drawings:

FIG. 2 is a detail sectional view showing the tilted position of the parachute attachment assembly with respect to the load suspension assembly when releasing the parachute;

FIG. 3 is an exploded view of the parachute load release;

FIG. 4 is a diagrammatic view showing the position of the center of gravity of the load with respect to the retardation system axis when descending;

FIG. 5 is a similar view with the center of gravity being displaced thirty degrees with respect to the retardation system axis upon landing of the load.

Figure 1:
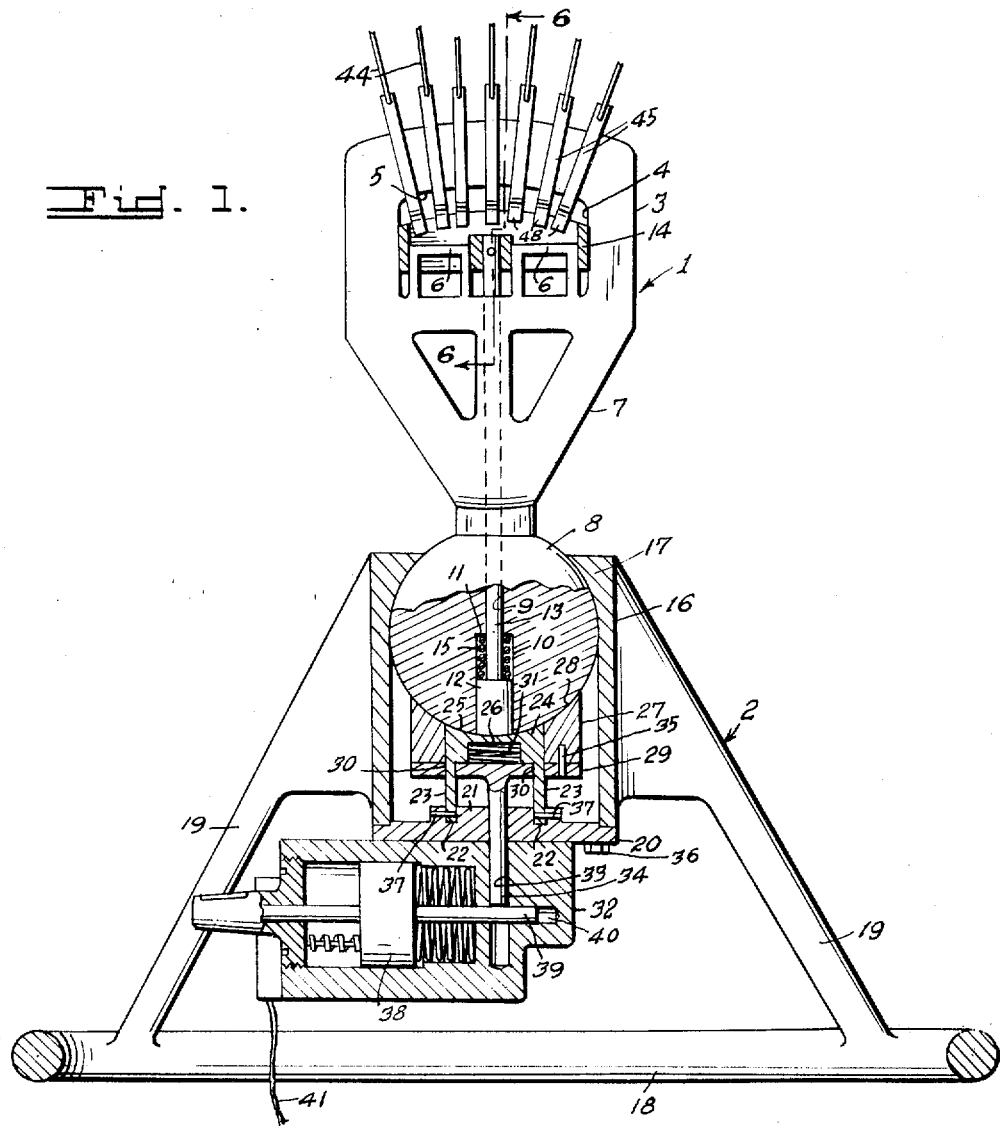
FIG. 1 is an elevational view, with parts in sections, of the parachute release of this invention.

Referring in detail to the drawings and particularly to FIG. 1, it will be seen that the load release comprises a two part mechanism. Reference character 1 indicates generally a parachute attachment assembly and 2, generally a load suspension assembly.

Parachute attachment assembly 1 consists of a one piece housing 3 which is provided at its upper portion with a cutout 4 having an arcuate roof 5 while its floor is provided with a pair of integral, laterally spaced, upstanding guides 6, as shown. The housing 3 diverges at its lower portion 7 and terminates in a ball 8 which may be secured to the housing 3 by any suitable means such as threads, not shown. An axially disposed bore 9 pierces housing 3 and extends from its floor through ball 8. This bore counterbored as at 10 to form a shoulder 11. A plunger 12 is slidable in counterbore 10 and is provided with an extension of smaller diameter 13 which is slidably received in bore 9. Fixed to the upper end of extension 13 is a rectangular shaped connector retainer 14 having an arcuate upper rim and which is slidable over guides 6. Retainer 14 is normally biased downwardly by a coil spring 15 which biases between plunger 12 and shoulder 11.

The load suspension assembly 2 comprises a tubular housing 16 which is provided from a thickened socket portion 17 at its upper end forming a seat for ball portion 8, thus providing a swivel joint between assemblies 1 and 2. The lower end of tubular housing 16 is provided with a closure plate 20 having a central boss 21 which is provided with a series of recesses 22 to receive prongs 23 of a ball retainer 24 having a concave upper surface 25 in which plunger 12 rides, and an axial bore 26 in its lower portion. A tubular arming sleeve 27 is slidable on ball retainer 24 and is provided with a concave upper rim 28 and further, with a closure plate 29 having a series of circumferential openings 30 for receiving prongs 23 of ball retainer 24 therethrough. A coil spring 31 in bore 26 biases plate 29 downwardly.

A third housing 32 is fixed to the lower side of plate 20 and is vertically bored as at 33 to receive a downwardly depending shaft 34 integral with the lower side of plate 29 and which is an axial alignment with plunger 12. Plate 29 is fixed to sleeve 27 by pins 35 and plate 20 is fixed to tubular housing 16 by bolts 36, while prongs 23 are secured in recesses 22 in boss 21 by pins 37. A safety member is mounted in housing 32 and consists of a spring biased piston 38 which is slidable in housing 32 and is provided with a shaft 39 slidable in a bore 40 intersecting bore 33, as shown. Piston 38 and shaft 39 could be prevented from premature axial movement from under shaft 34 by lanyard 41 extending through shaft 39 or connected to a pull pin (not shown) such as is illustrated in U.S. Patent No. 3,320,885 dated May 23, 1967.

OPERATION

Figure 6:
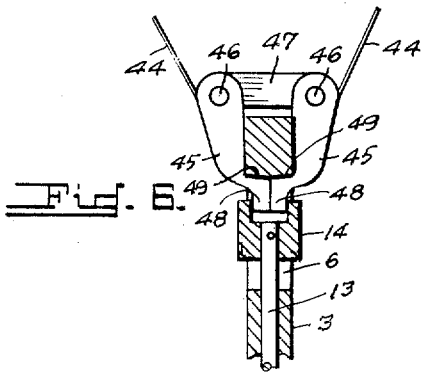
FIG. 6 is a sectional detail view taken along lines 6—6 of FIG. 1.

In use, the cargo load 42 may be secured by any suitable method, such as by tie ropes 43 (FIGS. 4 and 5) to ring 18 and a parachute, not shown, is detachably secured to the parachute attachment assembly 1 by a commonly used means in which the parachute risers 44 are connected to pairs of fingers 45 and which are pivoted as at 46 to a connector 47. See FIG. 6. These fingers 45 are contoured to form nose portions 48 at their free ends. The nose portions 48 are normally received in connector retainer 14, and, due to the contour of fingers 45 which provide shoulders 49 engaging under the arcuate portion of cutout 4, the fingers 45 are prevented from separation as long as the retainer 14 is held upward by plunger 12 and its extension 13, as seen in FIG. 1.

Lanyard 41 will be pulled before cargo 42 is deployed from an aircraft (not shown). Another method (not shown) would be to attach the free end of lanyard 41 to the cargo 42 so that it would be pulled as the slack is taken up in tie rope 43 which attaches the cargo 42 to ring 18. Also if desired, suitable timing devices also could be used to provide a delay when the cargo and chute is deployed before releasing shaft 39.

Once airborne, shaft 39 is moved from under shaft 34, as seen in FIG. 2, and even though the parachute and its cargo swings during its descent, the center of gravity of load 42 will be in the retardation system axis, as seen in FIG. 4, due to the system being taut. Hence, while the assembly is descending, action of winds will not cause separation of its parachute.

Normally when a cargo load has landed and there is no wind, the parachute will collapse and therefore presents no problem. But when a wind is blowing, the cargo is in danger of being dragged along the ground or yet, overturned, thus causing possible damage to the cargo.

The action of the assemblies 1 and 2 after descent and upon separation of the parachute is seen in FIG. 2. After the shaft 39 and piston 38 has released shaft 34, it moves downward under bias of spring 31 which, at the same time, moves arming sleeve 27 and closure plate 29 also down. Ball retainer 24 remains stationary, since it is fixed to plate 20. Plunger 12 biases against concave surface 25 of ball retainer 24 and thus the connector fingers 45 cannot be released.

Assuming now, that the assembly has landed and there is a wind blowing that is strong enough to drag cargo 42. No matter which direction the wind may come from, housing 3 will be pulled out of its alignment with the retardation system axis as best seen in FIG. 5. As soon as the two assemblies 1 and 2 are dislocated thirty degrees, plunger 12 will ride out of concave surface 25 of ball retainer 24 and under bias of spring 15, it will slide out of counterbore 10 and come to rest on concave rim 28 of sleeve 27, as shown in FIG. 2. Since extension 13 also moves downward, it also carries connector retainer 14 down to free fingers 45 to release the cargo parachute.

Parachute release assembly and its load suspension assembly may be reset for repeated use by pulling up connector retainer 14, arming sleeve 27 and resetting piston 38 and shaft 39 to the positions shown in FIG. 1.

As long as the arming sleeve 27 is prevented from moving down, the fingers 45 cannot be released no matter which direction the parachute attachment assembly tilts, so there will be no danger of release in handling before deployment.

While one preferred form of the invention is shown and described, other forms of the invention are contemplated and numerous changes and modifications may be made therein without departing from the spirit of the invention.

What is claimed is:

1. A load release for a cargo parachute comprising a first housing for releasable connection of the risers of a parachute thereto, a second housing tiltably connected to said first housing, a third housing attached below said second housing, a first member slidable in said first housing normally clamping said risers to said first housing, a second member slidable in said second and third housings for arming said first member and a third member slidable in said third housing and having an axis normal to said first and second members normally blocking axial movement of said second member, said third member adapted to release said second member whereby said first member will release said risers when said first housing has tilted thirty degrees to either side with respect to said second housing.

2. A load release for the detachable connection of a parachute to a cargo load having an axial line of retardation and comprising a first housing for the securement of a parachute provided with risers and connecting fingers attached to the risers, said first housing having a cutout in its upper portion and a pair of laterally spaced guides rising from the floor of said cutout; axially disposed means slidable over said guides in said first housing for clamping said fingers on said first housing; a tubular second housing; means carried by said first and second housings for the swivable connection thereof; axially slidable means in said tubular housing for operating said slidable means for clamping said fingers; a third housing fixed to the lower end of said tubular housing; a safety member axially slidable in said third housing and including a shaft disposed normal to the axis of retardation of said load release and adapted to prevent release of said means for clamping said fingers, and a load suspension member attached to said tubular housing, said safety member adapted to release said means for clamping said fingers to permit said first housing to tilt with respect to said second housing to release said fingers upon reaching a tilt of thirty degrees with respect to the axis of said load release.

3. A load release as claimed in claim 2 wherein said means for clamping said fingers comprises a rectangular retainer slidable over said guides in said cutout and adapted to receive the free ends of said fingers therein; a spring biased plunger having an extension connected to said retainer and being axially slidable in said first housing.

4. A load release as claimed in claim 2 wherein said swivable connecting means between said first and second housings comprises an axially disposed ball secured to the lower end of said first housing and a concave socket formed in the upper end of said tubular housing adapted to receive said ball whereby said first housing will be capable of tilting in all directions with respect to said second housing.

5. A load release as claimed in claim 2 wherein said means slidable in said tubular second housing for operating said means for clamping said fingers comprises an axially bored closure plate attached to the lower end of said tubular housing, a spring biased ball retainer having a concave upper surface and a pair of downwardly extending prongs fixed at their bottom ends to the upper side of said closure plate, an arming sleeve slidable on said ball retainer; a closure plate attached to the bottom of said sleeve and having a pair of openings receiving said prongs therethrough, said last named closure plate having an axially disposed, downwardly depending shaft slidable through said closure plate on the lower end of said tubular housing, its slidable movement normally being blocked by said shaft carried by said safety member whereby when said shaft on said safety member is moved from under said shaft on said last named closure plate said arming sleeve and said last named shaft will move downward to permit said first housing to tilt and release said fingers.

6. A load release as claimed in claim 2 wherein said load suspension member comprises a ring disposed in a plane normal to the retardation axis of said load release and a series of legs connecting said ring in spaced relation below said load suspension member.

References Cited

UNITED STATES PATENTS 3,153,395   10/1964   Karp _____ 244—151

FOREIGN PATENTS 1,279,686   11/1961   France.

FERGUS S. MIDDLETON, Primary Examiner

J. E. PITTENGER, Assistant Examiner